United States Patent
Saam

(10) Patent No.: US 6,177,510 B1
(45) Date of Patent: Jan. 23, 2001

(54) AIR CURING WATER BASE COPOLYMERS AND METHOD OF PREPARATION

(75) Inventor: John C. Saam, Midland, MI (US)

(73) Assignee: Michigan Molecular Institute, Midland, MI (US)

(*) Notice: Under 35 U.S.C. 154(b), the term of this patent shall be extended for 0 days.

(21) Appl. No.: 09/290,055

(22) Filed: Apr. 12, 1999

(51) Int. Cl.[7] ............... C08J 3/00; C08K 5/09; C08K 5/10; C08L 31/00; C08L 33/00
(52) U.S. Cl. ............ 524/773; 524/556; 524/559; 524/798; 526/75; 526/238.3; 526/323.1
(58) Field of Search ............... 524/556, 559, 524/773, 798; 526/75, 238.3, 323.1

(56) References Cited

U.S. PATENT DOCUMENTS 4,547,556 * 10/1985 Hughes ........................... 526/75
5,750,751    5/1998 Saam .

OTHER PUBLICATIONS

T. Nabuurs et al., Prog. In Org. Coatings, 27, 163 (1996).
Schork et al., J. Appl. Polym. Sci., 60, 2069 (1996).
E.M.S. van Hamersveld et al., Fatipec congr., 24, vol. D/247 (1998).

* cited by examiner

Primary Examiner—Patrick D. Niland
(74) Attorney, Agent, or Firm—Price, Heneveld, Cooper, DeWitt & Litton

(57) ABSTRACT

An aqueous dispersion comprising a copolymer which is the polymerization product of a mixture of vinylic monomers wherein from about 5% to about 90% by weight of the vinylic monomers are selected from co-esters of a drying oil acid and an unsaturated α, β-polymerizable unsaturated carboxylic acid, contains from about 0.5% to about 50% by weight based on the weight of the copolymer of a hydrophobic ester or partial ester of a drying oil acid and a polyol. The copolymer polymerized in the presence of the hydrophobic ester or partial ester is characterized by a relatively low gel content, and by a relatively broad, multi-nodal, molecular weight distribution, including a low molecular weight component which acts as a transient plasticizer and coalescing agent. The aqueous dispersions can be formulated into quick drying coating compositions which form smooth protective films on various substrates, without requiring volatile coalescing agents.

27 Claims, No Drawings

AIR CURING WATER BASE COPOLYMERS AND METHOD OF PREPARATION

FIELD OF THE INVENTION

This invention relates to the field of water dispersible coating compositions.

BACKGROUND OF THE INVENTION

Latex coatings offer the advantages of low solvent content, toughness, high molecular weight polymers, fast drying times, and easy clean-up. However, they lack the convenient autoxidative cross-linking mechanism associated with drying oils and their derived alkyd resins.

Alkyd resins are made by condensation polymerization of dihydric or polyhydric alcohols, polybasic acids and a drying oil glyceride or acid. Typically, the drying-oil glyceride form is converted to a monoglyceride, which is then reacted with an acid or acid anhydride to create an alkyd resin. When such resins are applied as coatings, the polymer backbones cross-link through polymerization of the drying-oil upon exposure to oxygen. The presence of trace amounts of certain metal salts, such as cobalt naphtheneate, serve as catalysts to attain sufficiently rapid cure times. Very hard durable coatings are formed from alkyd resin paints.

The traditional alkyd resin coating systems are a solvent based, low molecular weight materials that offer good penetration into wood and other porous substrates. However, their use has become increasingly undesirable on account of their high volatile solvent content (VOC). Traditional alkyd resin coating systems are also undesirable on account of their slow drying times.

In order to provide a more environmentally acceptable system, considerable effort has been devoted to modifying alkyd systems so they can be water dispersible. One approach receiving attention is a hybrid system wherein an acrylic resin is formed by emulsion polymerization in the presence of a previously dispersed alkyd resin in an attempt to combine the best features of both. Although potential benefits can be seen in some cases, the hybrid systems generally suffer from a mutual incompatibility of the components that can be problematic. As alkyd content increases, phase separation and haze develop in unpigmented films. See T. Nabuurs et al., *Prog. In Org. Coatings,* 27, 163 (1996).

A recently introduced method of pre-emulsion or mini-emulsion polymerization (see Schork et al., *J. Appl. Polym. Sci.,* 60, 2069 (1996) and E. M. S. van Hamersveld et al., *FATIPEC congr.,* 24, VOL D/247 (1998)) differs from conventional emulsion polymerization by proceeding in a single stage while not requiring diffusion of the vinylic monomers through an aqueous phase. During mini-emulsion polymerization, the monomers are pre-emulsified as small uniform particles along with a purposely added hydrophobic component. The hydrophobic component retains the more water-soluble monomers within the original particles which are the locus of the polymerization. Hence, there is no second generation of particles as there is in conventional emulsion polymerization. Thus, mini-emulsion polymerization provides a more efficient inclusion of highly water-insoluble species such as an alkyd resin. Schork et al. use a polymeric hydrophobe as an additive to a solution of the alkyd resin in vinylic monomers which are then dispersed in an aqueous solution of surfactants. Van Hamersveld et al. used essentially the same procedure, but with hexadecane as the hydrophobic additive. The dispersions in both cases were then homogenized with ultra sound or high pressure impingement.

The polymerizations of Schork et al. were initiated with persulfate at 60° C. or greater while those of van Hamersveld et al. were initiated with a redox system at 30° C. Schork et al. demonstrated that their mini-emulsion method gave grafting of acrylic monomers to co-emulsified alkyd resins due to the participation of 20 to 30% of the double bonds in the drying oil structures from the alkyd in the polymerization. Van Hamersveld et al. also reported grafting. Both Schork et al. and van Hamersveld et al. claimed more homogenous blends of the mutually incompatible acrylic and alkyd resins, and claimed that the resulting latices formed films that underwent autoxidative cure. However, Schork et al. reported that haze and non-uniformities developed in the films as the amount of alkyd resin was increased.

A more direct approach to introducing autoxidative cure to a latex system was disclosed by the inventor of the present invention, John C. Saam, in U.S. Pat. No. 5,750,751. This patent describes copolymerization of vinylic monomers with glycol co-esters of drying oil acids and $\alpha,\beta$-unsaturated polymerizable carboxylic acids using aqueous emulsion polymerization. The glycol co-esters of drying oil acids and $\alpha,\beta$-unsaturated polymerizable carboxylic acids, which have both an acrylate functional group and drying oil functionalities, were significantly more reactive than the alkyd resins of either Schork et al. or van Hamersveld et al. Also, there was no dilution of the drying oil function by other ingredients which would contribute to incompatibility, such as the polyester segments which are present in alkyd resins. Accordingly, the co-polymers described in U.S. Pat. No. 5,750,751 did not exhibit any incompatibility problems, formed clear continuous films, and underwent autoxidative cure in the presence of a drying catalysts. However, in order to obtain uniformly clear continuous films, the illustrated coating composition in U.S. Pat. No. 5,750,751 contained 9 weight percent on total emulsion or 18 weight percent on solids of a volatile coalescing solvent, namely 2-butoxyethanol. Volatile coalescing solvents are commonly used in latex formulations to facilitate uniform film formation by acting as transient plasticizers, and by reducing the glass transition temperature and initial hardness of freshly deposited films. See J. B. Clarke et al., *Waterborne Coatings and Additives,* D. R. Kasa and W. D. Davies editors, The Royal Society of Chemistry, Publ. No. 195, 1995, page 18.

However, the use of coalescing solvents is unacceptable when more environmentally benign coating systems are desired. It has been determined that the coating compositions illustrated in U.S. Pat. No. 5,750,751 must contain a coalescing solvent to obtain a uniform clear continuous film when emulsion copolymerizations are conducted at temperatures exceeding 60° C. The high gel content is probably due to side reactions which lead to grafting and copolymerization through the double bonds of the drying oil structures which are pendant from the copolymer chain.

SUMMARY OF THE INVENTION

The present invention provides an aqueous dispersion which can be used in a water based coating composition which is free of volatile coalescing agents, and which can cure and harden by autoxidation under ambient conditions to form a continuous protective coating.

The aqueous dispersion includes a polymer which is a polymerization product of vinylic monomers, wherein from about 5% to about 90% by weight of the vinylic monomers are selected from co-esters of a drying oil acid and an unsaturated α,β-polymerizable unsaturated carboxylic acid, and from about 0.5% to about 50% by weight, based on the weight of the copolymer, of a hydrophobic ester or partial ester of a drying oil acid and a polyol.

The invention also pertains to a method of preparing an aqueous polymer dispersion by polymerizing vinylic monomers in the presence of an initiator, a hydrophobic ester or partial ester of a drying oil acid and a polyol, a reducing agent, and a compound that reversibly changes oxidation state.

DESCRIPTION OF THE PREFERRED EMBODIMENTS

The aqueous dispersions of copolymers of vinylic monomers and monomers which are co-esters of drying oil acids and polymerizable unsaturated acids are prepared by free radical emulsion polymerization at low temperature, wherein the monomers are pre-emulsified as a mini-emulsion, and wherein the hydrophobic additives which retain the more water-soluble monomers are carbinol esters of drying oil acids, rather than the polymeric hydrophobe of Schork et al. or the volatile hexadecane of van Hamersveld et al.

The aqueous dispersions of this invention refer to water based dispersions in which the particles suspended in the aqueous media have an average diameter less than 5,000 nanometers. For purposes of this invention, aqueous dispersions include solutions and emulsions, the distinction depending on the diameter of the suspended particles, with aqueous solutions having an average particle size of less than about 20 nanometers. However, the emphasis herein is on emulsions and their derived latex coating compositions. As used herein, emulsions are aqueous dispersions, usually stabilized with surfactants, having an average particle size of from about 20 nanometers to about 2,000 nanometers. As used herein, a latex is an emulsion specially composed or formulated with additives, such as drying catalysts, fillers, pigments, fungicides, etc., so as to be useful in a particular application. As described in the Background Of The Invention, mini-emulsion polymerization is a polymerization or copolymerization where a homogenized aqueous emulsion of monomers is formed prior to free radical initiation, and wherein a hydrophobic component is included in an oil phase to fix the locus of polymerization within the original particles, i.e., there is little or no formation of a second generation of particles as in conventional emulsion polymerization.

Suitable co-esters which may be employed in preparing the copolymers of this invention have the general formula:

$(R_dCO_2)_1(M)_mZX_n$ wherein $R_d$ represents structures with at least one carbon-carbon double bond, but preferably more than one, and which are derived from a $C_{10}$–$C_{24}$ drying-oil acids such as oleostearoyl, linoleoyl, linolenoyl, oleoyl, arachidonoyl as single entities or in naturally occurring combinations that result form the processing of linseed oil, tung oil, soybean oil, menhaden oil, tall oil, dehydrated castor oil and the like. In these acids, or their naturally occurring ester derivatives, $R_d$ is capable of forming hydroperoxy structures upon exposure to air that subsequently cleave to form RO. and HO. radicals when catalyzed by certain metal salts. Z is an aliphatic or aliphatic-aromatic hydrocarbyl or heterohydrocarbyl radical having 1+m+n open valences where 1 and m are each a positive integer having a minimum value of one. X is hydroxyl, acyloxyl, halogen, alkoxyl or carboalkoxyl group, and n is zero or a positive integer. Illustrative of Z are:

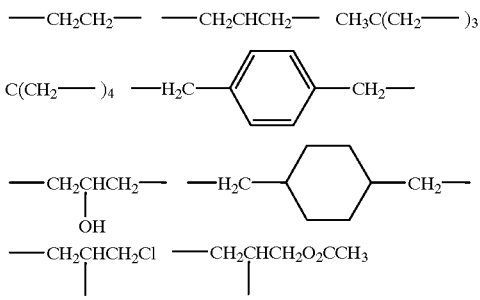

Z can also be polymeric or copolymeric as for example in carbinol-functional polyesters or in copolymers where the repeating units include such structures as:

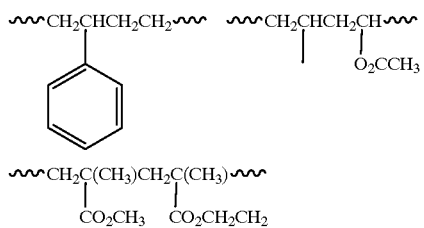

M represents an unsaturated moiety including at least one polymerizable carbon-carbon double bond and one or more carboxyl groups which link the unsaturated moiety (M) to radical Z. The unsaturated moiety M may also include various pendant groups which are free of polymerizable carbon-carbon double bonds such as hydrogen, alkyl, arylalkyl, aryl, chloroethyl, carboxy or carboxyester. Desirably, the unsaturated moiety (M) is the residue of an unsaturated carboxylic acid which has been linked to radical Z through one or more carboxylic groups via an esterification reaction. Suitable unsaturated carboxylic acids include those having one or more unsaturated carbon-carbon double bonds, and independently having one or more carboxylic groups. Specific examples include acrylic acid, methacrylic acid, α-haloacrylic acid, 2,4-pentadienoic acid, sorbic acid, maleic acid and itaconic acid as well as the partial esters of the dicarboxylic acids.

Illustrative examples of the co-esters produced by the biphasic method are:

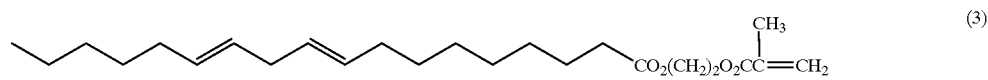

(3)

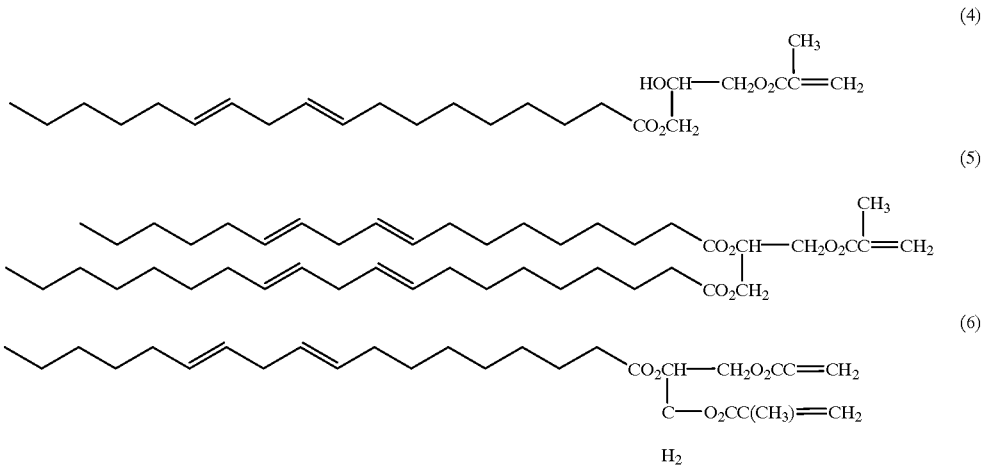

These may exist as single entities or as various mixtures. Additional examples of suitable co-esters which may be employed in the practice of this invention and methods of preparing the co-esters are described in further detail in U.S. Pat. No. 5,750,751 which is incorporated by reference herein.

The vinylic monomers which may be used in preparing the copolymers of this invention include acrylic or methacrylic acid esters such as methylacrylate, methyl methacrylate, ethylacrylate, ethylmethacrylate, propylacrylate, propylmethacrylate, butylacrylate, butylmethacrylate, 2-ethylhexylacrylate, 2-ethylhexylmethacrylate, decylacrylate, decylmethacrylate, hydroxyethylacrylate, hydroxyethylmethacrylate, hydroxypropylacrylate and hydroxypropylmethacrylate; alkenes such as ethylene and propylene; and polymerizable carboxylic acids such as acrylic acid, methacrylic acid, itaconic acid, maleic acid and fumaric acid. Examples of other suitable vinyl monomers which may be employed include acrylamide; acrylonitrile; dienes such as 1,2-butadiene, 1,3-butadiene and chloroprene; 1,3,5-hexatriene; styrenic monomers such as styrene, α-methyl styrene, vinyl toluene; vinyl carboxylate esters such as vinyl acetate; vinyl versatate; vinyl halides such as vinyl chloride and vinylidene chloride; etc. Preferred vinylic monomers include acrylic acid, methacrylic acid, acrylic acid and methacrylic acid esters of aliphatic or aromatic alcohols, styrene, substituted styrenes, vinyl acetate and other vinyl carboxylate esters.

The hydrophobic component used to retain the more water-soluble monomers and fix the locus of polymerization during the mini-emulsion polymerization are hydrophobic esters or partial esters of drying oil acids with polyols. The drying oil acids used to form the hydrophobic esters or partial esters are generally the same as those used to prepare the co-esters described above (e.g., $C_{10}$–$C_{24}$ drying oil acids). Suitable hydrophobic esters or partial esters of a drying oil acid and a polyol include diesters of ethylene glycol and a $C_{10}$–$C_{24}$ drying oil acid, and mono-, di-, and triglycerides of $C_{10}$–$C_{24}$ drying oil acids. Examples of polyols which may be used to form the hydrophobic component used to fix the locus of polymerization during mini-emulsion polymerization include ethylene glycol, glycerine, trimethylolpropane, pentaerythritol and the like. Illustrative examples of hydrophobic esters of drying oil acids with polyols include monoesters and diesters of ethylene glycol and soya acids, linseed oil acids, tall oil acids, etc.; and mono and diglycerides of soya acids, linseed oil acids, tall oil acids, dehydrated castor oil acids and partial esters of linoleic acid, etc. The hydrophobic esters of drying oil acids with polyols, in addition to serving as the locus of polymerization, may also act as temporary plasticizers and facilitate film formation. The hydrophobic esters of drying oil acids with polyols, however, are not volatile, and are capable of linking with the copolymer chains through the double bonds of the drying oil structures upon exposure to air, especially in the presence of drying catalysts.

Copolymers of this invention are prepared by free radical emulsion polymerization at low temperature with the monomers pre-emulsified as a mini-emulsion. A pre-emulsion of the copolymers is prepared in an aqueous solution containing surfactants, a reducing agent, and a species that reversibly changes oxidation state. A chain regulator may, and preferably is, included in the pre-emulsion. Before introducing a free radical initiator into the system to initiate polymerization, the pre-emulsion is homogenized, and oxygen is preferably displaced from the polymerization system with an inert gas.

The amount and type of surfactants used in preparing the copolymers of this invention are not believed to be particularly critical. Suitable surfactants include anionic, non-ionic, and combinations thereof. Examples of anionic surfactants include salts of fatty rosin and naphthenic acids, condensation products of napthalene sulfonic acid and formaldehyde of low molecular weight, carboxylic polymers and copolymers of the appropriate hydrophile-lipophile balance, alkali or ammonium alkyl sulfates, alkyl sulfonic acids, alkyl phophonic acids, fatty acids, oxyethylated alkyl phenol sulfates and phosphates. Examples of non-ionic emulsifiers include alkylphenol ethoxylates, polyoxyethylenated alkyl alcohols, amine polyglycol condensates, modified polyethoxy adducts, long chain carboxylic acid esters, modified terminated alkylaryl ether, and alkylpolyether alcohols. The amount of surfactant used is typically from about 0.1 to about 10% by weight based on the total weight of all monomers.

The polymerization is initiated by free radical initiators, such as, for example, hydrogen peroxide, benzoyl peroxide, t-butyl hydroperoxide, t-butyl peroctoate, ammonium and alkali persulfates. The initiator is typically employed at a level of from about 0.05% to about 5% by weight based on the total weight of all monomers.

A redox initiation system is used in which the initiators are coupled with a suitable reducing agent and a compound that reversibly changes oxidation state. Examples of reducing agents include reducing sugars, sodium formaldehyde sulfoxylate, and various amines. Suitable compounds that reversibly change oxidation state include various metal ions and their complexes, such as complexed ferric and ferrous ions with ethylenediaminetetraacetetate (EDTA) being common examples. Another example of a suitable ferric complex which can reversibly change oxidation states is ferrocene. The reducing agents are typically employed at a level of from about 0.5 to about 10% by weight based on the total weight of all monomers. The species that reversibly changes oxidation state is typically present in an amount of from about 0.001 to about 1.5% by weight based on the total weight of all monomers.

Chain transfer agents or chain regulators are desirably employed in an amount of from about 0.001 to about 5.0% by weight based on the total weight of all monomers. A chain regulator or chain transfer agent is an agent that restricts molecular weight when present in a small amount during polymerization. Typically chain transfer agents include alkyl thiols such as n-dodecyl thiol and t-octyl thiol. Certain halogen compounds are also useful, such as carbon tetrabromide. Chain transfer agents do not stop polymerization, they terminate one chain while starting a new growing chain. The overall or net effect is more polymer chains for a given amount of monomer, and, hence, a lower average molecular weight.

The co-esters of drying oil acids and $\alpha,\beta$-polymerizable unsaturated acids may comprise from about 5% to about 90% of the total weight of all monomers. When hydroxyl functional monomers (such as hydroxyethyl methacrylate) and/or carboxylic acid functional monomers (such as acrylic acid) are employed, the total weight of all hydroxyl functional monomers and carboxylic functional monomers preferably does not exceed about 20% of the total weight of all monomers.

The hydrophobic esters or partial esters of drying oil acids with polyols, which are used to fix the locus of the polymerization within the original particles during mini-emulsion polymerization, is preferably present in an amount of from about 0.5 to about 50% by weight based on the total weight of all monomers. The hydrophobic esters and partial esters are not included in the monomer total, as they are not incorporated into the copolymer during copolymerization. Accordingly, after polymerization is complete, the resulting aqueous dispersion contains from about 0.5 to about 50% by weight of hydrophobic esters or partial esters of drying oil acids with polyols based on the total weight of the copolymers in the dispersion.

The preferred temperatures at which polymerization is performed depends on the monomers selected. However, the mini-emulsion polymerization is preferably carried out at temperatures below 40° C., typically from about 5° C. to about 30° C., and most preferably from about 5° C. to about 15° C.

The resulting emulsion copolymers are preferably neutralized with basic hydroxides or amines to a final pH greater than 5, preferably from about 7 to about 9. It has been found that the resulting copolymers have a relatively broad, multi-nodal molecular weight distribution, typically containing a significant fraction of relatively low molecular weight copolymer. Preferably, from about 1% to about 80% of the copolymer molecules in the aqueous dispersion have a low molecular weight fraction of from about 300 to about 3,000 (i.e., $3,000>M_n>300$). Low molecular weight copolymer forms when chain regulators are present during copolymerization. The low molecular weight copolymer can perform a coalescing function in coating compositions, similar to that of the polyol esters and partial esters of the drying oil acids, which preferably are present. The lower molecular weight copolymers (those having a molecular weight of from about 300 to about 3,000) behave as a coalescing solvent, similar to the volatile organic solvents typically added to latex formulations to act as a temporary plasticizer which facilitates film formation. However, unlike the typical coalescing solvents, such as 2-butoxyethanol and 2,2,4-trimethylpentane-1,3-diol monoisobutyrate, the lower molecular weight copolymers of co-esters of drying oil acids and polymerizable unsaturated carboxylic acids are not volatile. Although the lower molecular weight copolymers of the co-esters behave as temporary plasticizers and facilitate film formation, they are capable of cross-linking with other copolymers through the double bonds of the drying oil structures which are pendant from the copolymer chain, especially in the presence of organometallic drying catalysts.

The aqueous dispersions of copolymers can be employed in various water-based paints, coatings, inks, adhesives and sealants. A drying catalyst is preferably added to the aqueous dispersion of copolymers to accelerate the autoxidative cross-linking and hardening of the copolymers and hydrophobic esters or partial esters of drying oil acids with polyols. The drying catalysts (also known as dryers or siccatives) are generally organometallic compounds, typically transition metal soaps such as cobalt naptheneate. Other examples include manganese, lead and zirconium soaps. The cobalt, manganese, lead and zirconium soaps are sometimes used in combination with other metal soaps, such as calcium or potassium soaps, which in themselves are not dryers.

Fillers, extenders, pigments and other additives known in the art may also be used in the compositions of this invention, if desired.

The dispersions of this invention, when suitably formulated, produce films that cross-link and harden upon exposure to air much like the alkyd resins, while retaining many of the properties of the vinylic addition polymers, such as fast drying times. The latex compositions are useful as pigmented or unpigmented coatings on steel and wood, and do not require adding coalescing solvents to form continuous films. The copolymers, are characterized by a relatively low gel content, e.g., from zero to about 75% by weight. This low gel content distinguishes the copolymers of the present invention from the highly gelled copolymers described in U.S. Pat. No. 5,750,751, which require a coalescing solvent to form continuous films (see Example 4 in the '751 patent and the comparative Example 1 described herein).

The compositions are further distinguished by a low molecular weight component of the copolymer having a similar composition as the remaining, higher molecular weight copolymer component, but richer in the drying oil function. This can act as a transient, non-volatile plasticizer that facilitates smooth continuous film formation when the coatings are deposited and then, in the presence of drying catalysts, cure with the rest of the copolymer upon exposure to air. Such low molecular weight components play a role similar to coalescing solvents, but, being of a molecular weight too high to be volatile, release little or no vapor to the environment either during or prior to the drying and curing processes.

The dispersions when combined with drying catalysts form clear protective cross-linked films when coated on steel or wood substrates. The coatings are unique in that, even in the absence of special additives or pigments, they prevent rusting when coated on untreated steel substrates exposed to moisture. Comparative compositions made in an identical manner, but without a monomer consisting of a co-ester of a drying oil acid and a polymerizable $\alpha,\beta$-unsaturated acid, show extensive rusting under the same conditions. The present latexes when applied to wood substrates give scrub resistant smooth surfaces with none of the rise in grain that produces the corduroy surfaces sometimes seen when clear latex coatings are applied to wood.

The present invention is illustrated in more detail by the following examples. The examples are intended to be illustrative, and should not be interpreted as limiting or otherwise restricting the scope of the invention.

EXAMPLE 1

A mini-emulsion copolymerization of 2-acryloxyethyl soyate is conducted at temperatures substantially lower than those disclosed in prior procedures. The copolymer was gel-free and contained a lower molecular weight portion enriched with copolymerized 2-acryloxyethyl soyate.

The following solutions were prepared:

Solution A, oil phase:

| Component | Weight (g) |
| --- | --- |
| Ferrocene | 0.0047 |
| Methacrylic acid | 0.500 |
| Dodecane thiol | 0.500 |
| 2-Acryloxyethyl soyate* | 4.6 |
| 1,2-Ethylene disoyate | 1.0 |
| 2-Hydroxyethyl soyate | 1.4 |
| Butyl acrylate | 7.00 |
| Methyl methacrylate | 14.00 |

*Made according to the method in U.S. Pat. No. 5,750,751, wherein the partial ester, 2-hydroxyethyl soyate, is esterified with acrylic acid.

Solution B, surfactants:

| Component | Actual Weight (g) | Solution weight (g) |
| --- | --- | --- |
| Aerosol TO ™*, 10% aqueous solution. | 0.80 | 8.0 |
| Triton X-405 ™**, 7% aqueous solution. | 0.43 | 6.2 |
| Deionized water | 35.0 (total) | |

*Aerosol OT: sodium dioctyl sulfosuccinate. **Triton X-405: polyoxyethylene (DP¯40) isoctylphenyl ether.

Solution C, reducing agent:

| Component | Weight (g) |
| --- | --- |
| Sodium formaldehyde sulfoxylate | 0.40 |
| Deionized water | 5.00 |

Solution D, initiator:

| Component | Weight (g) |
| --- | --- |
| Tertiary butyl hydroperoxide (70%) | 0.40 |
| Deionized water | 5.00 |

Solutions A and B were dispersed together by stirring, chilled and then homogenized for 2.0 min. with ultrasound supplied by a 600 W sonic disperser equipped with a ¼" probe operating at 19% power. Solution C was then admixed and the sonic homogenization continued for another 0.50 min. The resulting emulsion was transferred to a reactor equipped with a thermometer, stirrer, condenser, injection port and an inlet and outlet for nitrogen. While being stirred at about 300 rpm the emulsion was purged with nitrogen while the temperature was adjusted to 10° C. After about 20 min. roughly 10% increments of Solution D were injected over a period of about 1 hr. while maintaining the temperature between 10 and 12° C. with the occasional use of an external ice bath. The emulsion was then warmed to room temperature (20.5° C.) with stirring under nitrogen. A small sample removed from the emulsion was found to have a solids content of 39.5%. (A 100% monomer conversion would result in a 40.4% solids content.) Additional stirring under nitrogen for 18 h gave no further change in solids content. Negligible amounts of coagulum formed as a result of some evaporation of water from the emulsion that had occurred during the polymerization. Otherwise, the coagulum yield was zero and the resulting emulsion gave no indication of creaming or destabilization. The pH was adjusted to 8.5–9 by slowly adding ammonium hydroxide with stirring.

Light scattering measurements indicated a mean particle diameter of the number distribution of 61.9 nm and of the volume distribution of 87.7 nm. Dried films cast from the emulsion were continuous and clear. The films dispersed completely in acetone, methyl ethyl ketone, tetrahydrofuran or toluene leaving no residual gel. The copolymer was isolated by adding 4.89 g of the emulsion dropwise with stirring to 40 ml of methanol. The separated floc was washed twice with methanol and dried in vacuo at room temperature for 2 h to give 1.60 g. of a solid. This was further separated into hexane-soluble and hexane insoluble portions by dissolving a 1.09 g portion in 40 ml of tetrahydrofuran and adding the solution dropwise with stirring to 170 ml of hexane. The precipitate was separated by decantation and washed twice with hexane. The supernatent hexane and washings were combined and the solvent was evaporated to leave a residue. The hexane-soluble and insoluble portions were dried in vacuo at 40° C. to give 0.873 g. of hexane-insoluble and 0.178 g of hexane soluble portions. Infrared (FTIR) spectra of the fractions were similar except that the hexane soluble fraction gave stronger bands corresponding to the soya entity at 3005 cm$^{-1}$ (cis-HC=CH, CH stretch) and 723 cm$^{-1}$ (($CH_2$)$_n$, rocking, n>6) than either the whole polymer or the hexane-insoluble fraction. Molecular weights of the isolated copolymers:

| Component | Wt. % | $M_n$* | $M_w$* | Distribution |
| --- | --- | --- | --- | --- |
| Whole copolymer | — | 4,130 | 513,000 | Broad, multi-nodal |
| Hexane-soluble | 16.9 | 1,250 | 6290 | Broad, multi-nodal |
| Hexane-insoluble | 83.1 | 15,200 | 401,000 | Broad, two nodes |

*Determined by SEC on a Waters system equipped with a refractive index detector and two columns packed with mixed - C PL 5 μm gel calibrated with polystyrene standards. The mobile phase was tetrahydrofuran.

Comparative Example 1

This illustrates a copolymer similar to that of example 1, by made by a high temperature mini-emulsion copolymerization that is a adaptation of that of Schork et al. In order to prevent excessive thickening, the final emulsion was at a higher dilution than that of example 1.

The following solutions were prepared:

A, the oil phase:

| Component | Weight (g) |
| --- | --- |
| 50% copolymer solution in toluene* | 3.9 |
| Dodecane thiol | 0.9 |
| Acrylic acid | 1.1 |
| 2-Acryloxyethyl soyate | 14.3 |
| 1,2-Ethylene disoyate | 4.1 |

-continued

| | | |
|---|---|---|
| 2-Hydroxyethyl soyate | 5.6 | |
| Methyl methacrylate | 24.0 | |

*Made by a solution copolymerization at 80° C. for 20 h of 2.50 g of 2-acryloxyethyl soyate, 2.50 g of methyl methacrylate, 0.010 g of dodecane thiol and 0.026 g of azobisisobutyronitrile in 5 ml of toluene. The role of the copolymer according to Schork et al. is that of a hydrophobic cosurfactant.

B, aqueous phase:

| Component | Amount (ml) | Actual weight (g) |
|---|---|---|
| 10% Makon-10* | 7.0 | 0.70 |
| Deionized water | 42.4 | 61.6 |
| Subsequently added 4% potassium persulfate | 10.2 | 0.41 |
| Subsequently added water and ammonium hydroxide | | 124.5 |

*Makon-10: polyoxyethylene (DP⁻10) isooctylphenyl ether.

Solution A was slowly added with stirring to solution B. The resulting crude emulsion was then homogenized with ultrasound (¼" probe at 20% power for 10 minutes) while being chilled in an ice bath. Then 5.1 ml of a 4% solution of potassium persulfate was added, the mixture was transferred to a 250 ml flask and flushed with argon while being stirred. The flask was stoppered and then immersed in an oil bath at 80° C. and held there with stirring for one hour and then to 86° C. with stirring for an additional 2.5 h. Another 5.1 ml of the 4% solution of potassium persulfate was added and the heating and stirring were continued for another 2.5 h during which the original fluid emulsion thickened. The thick dispersion thinned to a fluid emulsion by folding in 120 ml of water and 4.5 ml of ammonium hydroxide followed by ultrasound homogenization under the previously described conditions. This gave a fluid emulsion essentially free of coagulum. The solids content was 20.2%. (100% monomer conversion calls for 21.8% solids. Solids content of the emulsions from Schork et al. were roughly 29%.)

Dried films cast from the emulsion were hazy in appearance. They were insoluble in acetone and tetrahydrofuran, solvents that readily dissolved the films of example 1. Molecular weights of the isolated copolymer were not determined because of insolubility.

Comparative Example 2

An emulsion copolymer is prepared by a similar procedure as that in Example 1, but the 2-acryloxyethyl soyate is omitted.

The following solutions were prepared:

A, oil phase:

| Component | Weight (g) |
|---|---|
| Ferrocene | 0.005 |
| Methacrylic acid | 0.500 |
| Butyl acrylate | 14.00 |
| Methyl methacrylate | 14.00 |

-continued

B, surfactant solution:

| Component | Actual Weight (g) | Solution weight (g) |
|---|---|---|
| Aerosol TO ™*, 10% aqueous solution. | 0.80 | 8.0 |
| Sodium lauryl sulfate, 10% aqueous solution. | 0.60 | 6.0 |
| Deionized water | 35.0 (total) | |

*Aerosol OT: sodium dioctyl sulfosuccinate.

C, reducing agent solution:

| Component | Weight (g) |
|---|---|
| Sodium formaldehyde sulfoxylate | 0.40 |
| Deionized water | 5.00 |

D, initiator solution:

| Component | Weight (g) |
|---|---|
| Tertiary butyl hydroperoxide (70%) | 0.40 |
| Deionized water | 5.00 |

Solutions A and B were stirred together, chilled and then homogenized using ultrasound for 15 s supplied by a 600 W sonic disperser equipped with a ¼" probe and operating at 20% power. The emulsion was transferred to the reactor described in Example 1 and the system was flushed with nitrogen while the temperature was adjusted with an external ice bath to 14° C. 3.30 ml of solution C was injected followed by 0.5 ml of solution D while the stirring and a slow purge of nitrogen continued. The temperature reached 34° C. with continued stirring and external cooling with the ice bath. The temperature slowly subsided to 20° C. and a second of 0.5 ml of D was injected. This produced no further exotherm and the remaining of solutions C and D were added. The system was kept overnight under nitrogen at room temperature and the solids content determined on a small sample was 41.3%. (A 100% monomer conversion would require 41.9% solids.) The pH of the emulsion was adjusted to neutral which rendered it semi-translucent. There was essentially no coagulum and dried films from the emulsion were continuous, clear and soluble in the common solvents.

EXAMPLE 2

Using the same monomer composition and polymerization procedure as Example 1, but without the dodecane thiol chain regulator, a stable emulsion resulted having 41.8% solids. The polymerization temperature was 14° C. The gel content of the resulting copolymer was 70.4%.

EXAMPLE 3

The example further illustrates the influence of the chain regulator, dodecane thiol, on gel content of the copolymers of a differing composition.

The following solutions were prepared:

A, oil phase:

| Component | Weight (g) |
|---|---|
| Ferrocene | 0.0052 |
| Methacrylic acid | 0.50 |
| Dodecane thiol | 1.0 |

-continued

| Component | Actual Weight (g) |
|---|---|
| 2-Acryloxyethyl soyate* | 9.2 |
| 1,2-Ethylene disoyate | 1.9 |
| 2-Hydroxyethyl soyate | 2.9 |
| Methyl methacrylate | 14.00 |

*Made according to the method in U.S. Pat. No. 5,750,751 wherein the partial ester, 2-hydroxyethyl soyate, is esterified with acrylic acid.
B, surfactant solution:

| Component | Actual Weight (g) | Solution weight (g) |
|---|---|---|
| Aerosol OT ™*, 10% aqueous solution. | 0.80 | 8.0 |
| Sodium lauryl sulfate, 10% solution. | 0.60 | 6.0 |
| Deionized water | | 35.0 (total) |

*Aerosol OT: sodium dioctyl sulfosuccinate. Triton X-405: polyoxyethylene (DP⁻40) isooctylphenyl ether.
C, reducing agent solution:

| Component | Weight (g) |
|---|---|
| Sodium formaldehyde sulfoxylate | 0.40 |
| Deionized water | 5.00 |

D, initiator solution:

| Component | Weight (g) |
|---|---|
| Tertiary butyl hydroperoxide (70%) | 0.40 |
| Deionized water | 5.00 |

The identical procedure as that of Example 1 was followed. The temperature was maintained at 10±1° C. as solution D was fed to the pre-emulsion over a period of 1 h. The resulting emulsion was then flushed with argon, slowly warmed to room temperature and allowed to stand overnight (18 h). A small sample was taken which indicated 39.9% solids (100% monomer conversion calls for 41.2% solids). The pH was adjusted to 9.0 with ammonium hydroxide and the resulting emulsion was stored under argon. A dried cast film of a small portion of the emulsion dispersed completely in toluene, methyl ethyl ketone, diethyl ketone and chloroform leaving no gel residue. SEC gave a broad molecular weight distribution with multiple nodes; $M_n$=1649, $M_w$=569,195.

EXAMPLE 4

Using the same procedure and monomer compositions as Example 3, but at a 64% scale with one half the amount of dodecane thiol, gave 40.3% solids and a stable emulsion. The gel content of the isolated copolymer was 56.1%.

EXAMPLE 5

The example illustrates unanticipated continuous film formation from latices without added volatile coalescing agents. It also illustrates that the claimed compositions cross-link and harden upon exposure to air at room temperature in the presence of drying catalysts.

To 3.10 g of the emulsion prepared in Example 1, 0.055 g of Cobalt Hydrocure™ (6% Co) was added with mixing. A portion was poured out into an aluminum dish and allowed to dry in the open air at room temperature. After three days the resulting film became clear and pliable and the originally gel-free copolymer had cross-linked to the point where the insoluble gel content was now 62.2%.

A mixture of 10.00 g of the emulsion from Example 1, 0.0665 g of Cobalt Hydrocure™ and 0.0325 g of Zirconium Hydrocure™ (12% Zr) was coated with a draw-down bar on each of two untreated cold-rolled polished 3×6" steel panels as a 5 mil wet film and allowed to dry at room temperature while exposed to air. Coalescing solvents were absent. Within ½ h, the time required for most of the water to evaporate, a clear continuous film formed which was touch-dry and adherent to the substrate. In like fashion clear coatings of the emulsions from Example 2, 3 and 4 were prepared and allowed to dry under the same conditions. These were similar in appearance to those from Example 1.

Pencil hardness at various times was monitored as the coatings aged in air at room temperature:

| Emulsion from: | Dry Film Thickness (mil) | 1 Day Pencil Hardness | 10 Day Pencil Hardness | 20 Day Pencil Hardness | 32 Day Pencil Hardness* |
|---|---|---|---|---|---|
| Example 1 | 0.88 ± 0.03 | 8B | 3B | 2B | B |
| Example 2 | 0.57 ± 0.10 | >8B | 4B | 2B | B |
| Example 3 | 0.57 ± 0.05 | 8B | 4B | 4B | 2B** |
| Example 4 | 0.45 ± 0.06 | 8B | 4B | 2B | B |

*Little change in hardness after this time
**Failure due to flaking and loss of adhesion rather than scratching.

Comparative Example 5

(a) Two steel panels were coated in the same fashion as those in Example 5 using the emulsion described in Comparative Example 2 where 2-acryloxyethyl soyate was absent. These also dried quickly to give continuous clear adherent coatings but flash rusting was evident. (b) Continuous films with the emulsion from comparative Example 1 were also prepared in this fashion, but 10% (on solids) of a coalescing solvent, 2-butoxyethanol, was required in order to produce continuous films.

EXAMPLE 6

The example illustrates the unanticipated protective nature of the films made in Example 5.

After the 32 day drying period the panels made up from each of the emulsions of Example 5 and Comparative Example 5 were emersed in quiescent tap water overnight at room temperature. The panels from Example 5 were rust-free in the coated areas, even those based on the emulsions from Examples 3 and 4 where the films after emersion showed some blistering and a partial loss of adhesion. In sharp contrast, rusting was very apparent under the coated area of the panel from Comparative Example 5A where no 2-acryloxyethyl soyate was used to prepare the emulsion.

EXAMPLE 7

Utility is further illustrated as protective coatings on wood. The unanticipated benefit is that the latices do not require added volatile coalescing agents to form lustrous, scrub resistant films.

The latices in Example 5 were brushed on 3×6 ⅛" birch plywood panels as clear coatings. Prior to the first coat the panels were sanded first with # 180 sandpaper then with # 320 sandpaper followed by thorough cleaning in a jet of filtered air. After coating and drying 4–18 h the panels were sanded with # 320 sandpaper, cleaned in the air jet a second and third coat were applied. In one case a fourth coat was applied following the same regimen. This gave a very smooth, glossy surface showing the grain detail and color while having the appearance of what might be expected after multiple coats of a solvent based lacquer. Quality of Films of Example 7:

| Latex from: | Observations |
|---|---|
| Example 1* | Smooth lustrous surface, grain apparent, passes double rest test** |
| Example 2 | Smooth lustrous surface, grain apparent, passes double rub test** |
| Example 3 | Smooth lustrous surface, grain apparent, fails double rub test*** |
| Example 4 | Less luster, passes double rub test* |

*Four coats, three of the latex from Example 1, one final coat of latex from Example 2.
**Simulates scrubbing. Coating panels are rubbed in two directions in the same track under the load of the ball of a 24 oz ball-peen hammer with the ball covered with cheese cloth soaded with 5% sodium lauryl sulfate. Coatings pass the test if there is no visible wear track or damage to the substrate after 200 double rubs.
***Wears to substrate at 80–100 rubs.

EXAMPLE 8

The use of another vinylic monomer, styrene, in the place of methyl methacrylate is illustrated. Chain regulators are not used.

The following solutions were prepared:

| Component | Weight (g) |
|---|---|
| Ferrocene | 0.0507 |
| Methacrylic acid | 0.52 |
| 2-Acryloxyethyl soyate* | 4.1 |
| 1,2-Ethylene disoyate | 2.2 |
| 2-Hydroxyethyl soyate | 0.7 |
| Butyl acrylate | 7.0 |
| Styrene | 14.0 |

*Made according to the method in U.S. Pat. No. 5,750,751, wherein the partial ester, 2-hydroxyethyl soyate, is esterified with acrylic acid.
Solution B, surfactants:

| Component | Actual Weight (g) | Solution weight (g) |
|---|---|---|
| Aerosol OT ™*, 10% aqueous solution. | 0.80 | 8.0 |
| Triton X-405 ™**, 7% aqueous solution. | 0.42 | 6.0 |
| Deionized water | 35.0 (total) | |

*Aerosol OT: sodium dioctyl sulfosuccinate.
**Triton X-405: polyoxyethylene (DP¯40) isooctylphenyl ether.
Solution C, reducing agent:

| Component | Weight (g) |
|---|---|
| Sodium formaldehyde sulfoxylate | 0.40 |
| Deionized water | 5.00 |

Solution D, initiator:

| Component | Weight (g) |
|---|---|
| Tertiary butyl hydroperoxide (70%) | 0.40 |
| Deionized water | 5.00 |

The same general procedure and equipment were used as that of Example 1. Solutions A, B and C were stirred together and the crude emulsion was chilled and homogenized using ultrasound for three min. while continuing to flush the reactor with nitrogen, 0.5 ml increments of solution D were injected over a ¾ h period with stirring at 400 rpm at an initial temperature of 16° C. The temperature was maintained at 25–27° C. with the intermittent use of an ice bath throughout the addition. After the addition was complete, the nitrogen blanket was replaced with argon and the system was kept at room temperature (22° C.) for a 72 h period while small samples were intermittently removed from the emulsion. After 24 h it was evident that the copolymerization was incomplete and another 0.0985 g of sodium formaldehyde sulfoxylate in 1.05 g of water and 0.06 g of t-butyl hydroperoxide were injected. After 71 h the solids content was 37.6% and there was no further change. (Maximum conversion gives 39.6% solids). The emulsion was essentially free of coagulum and the gel content of the isolated polymer was 60.7%. Cast films of the emulsion were clear, adherent and rubbery.

The foregoing are merely preferred embodiments of the invention. Various changes and alterations can be made without departing from the spirit and broader aspects thereof as set forth in the appended claims, which are to be interpreted in accordance with the principles of patent law, including the doctrine of equivalents.

What is claimed is:

1. An aqueous dispersion comprising:
    a copolymer which is a polymerization product of vinylic monomers, from about 5% to about 90% by weight of the vinylic monomers being selected from co-esters of a drying oil acid and an α,β-polymerizable unsaturated carboxylic acid with a polyol; and
    from about 0.5% to about 50% by weight, based on the weight of the copolymer, of a hydrophobic ester or partial ester of a drying oil acid and a polyol.

2. The aqueous dispersion of claim 1, wherein from about 1 to about 80% of the copolymer molecules have a molecular weight of from about 300 to about 3,000.

3. The aqueous dispersion of claim 1, wherein the co-esters have the general formula $$(R_dCO_2)_1(M)_mZX_n$$

wherein $R_d$ is a structure including at least one carbon-carbon double bond and is derived from a $C_{10}$–$C_{24}$ drying-oil acid, M is a moiety including at least one polymerizable carbon-carbon double bond, X is a hydroxyl, acyloxyl, halogen, alkoxyl or carboalkoxyl group, Z is an aliphatic or aliphatic aromatic hydrocarbyl or heterohydrocarbyl radical having 1+m+n open valences, 1 and m are each a positive integer having a minimum value of 1, and n is zero or a positive integer.

4. The aqueous dispersion of claim 1, wherein the vinylic monomers comprise from about 5 to about 95% of monomers selected from the group consisting of acrylic acid, methacrylic acid, acrylic acid esters, methacrylic acid esters, alkenes, polymerizable carboxylic acids, acrylamide, acrylonitrile, dienes, styrenic monomers, vinyl carboxylate esters and vinyl halides.

5. An aqueous dispersion of claim 1, wherein the vinylic monomers comprise from about 5% to about 95% of monomers selected from the group consisting of acrylic acid, methacrylic acid, acrylic acid esters, methacrylic acid esters, styrenic monomers, and vinyl carboxylate esters.

6. The aqueous dispersion of claim 1, wherein the hydrophobic ester or partial ester of a drying oil acid and a polyol is selected from the group consisting of monoesters and diesters of ethylene glycol and a $C_{10}$–$C_{24}$ drying oil acid, and mono, di and triglycerides of $C_{10}$–$C_{24}$ drying oil acids.

7. A coating composition comprising:
    a copolymer which is a polymerization product of vinylic monomers, from about 5% to about 90% by weight of the vinylic monomers being selected from co-esters of a drying oil acid with an α,β-polymerizable unsaturated carboxylic acid with a polyol;

from about 0.5% to about 50% by weight, based on the weight of the copolymer, of a hydrophobic ester or partial ester of a drying oil acid and a polyol; and a drying catalyst.

8. The coating composition of claim 7, wherein from about 1 to about 80% of the copolymer molecules have a molecular weight of from about 300 to about 3,000.

9. The coating composition of claim 7, wherein the co-esters have the general formula $$(R_dCO_2)_1(M)_mZX_n$$

wherein $R_d$ is a structure including at least one carbon-carbon double bond and is derived from a $C_{10}$–$C_{24}$ drying-oil acid, M is a moiety including at least one polymerizable carbon-carbon double bond, X is a hydroxyl, acyloxyl, halogen, alkoxyl or carboalkoxyl group, Z is an aliphatic or aliphatic aromatic hydrocarbyl or heterohydrocarbyl radical having 1+m+n open valences, 1 and m are each a positive integer having a minimum value of 1, and n is zero or a positive integer.

10. The coating composition of claim 7, wherein the vinylic monomers comprise from about 5 to about 95% of monomers selected from the group consisting of acrylic acid, methacrylate acid, acrylic acid esters, methacrylic acid esters, alkenes, polymerizable carboxylic acids, acrylamide, acrylonitrile, dienes, styrenic monomers, vinyl carboxylate esters and vinyl halides.

11. The coating composition of claim 7, wherein the vinylic monomers comprise from about 5% to about 95% of monomers selected from the group consisting of acrylic acid, methacrylic acid, acrylic acid esters, methacrylic acid esters, styrenic monomers, and vinyl carboxylate esters.

12. The coating composition of claim 7, wherein the hydrophobic ester or partial ester of a drying oil acid and a polyol is selected from the group consisting of monoesters and diesters of ethylene glycol and a $C_{10}$–$C_{24}$ drying oil acid, and mono, di and triglycerides of $C_{10}$–$C_{24}$ drying oil acids.

13. A method of preparing an aqueous polymer dispersion, comprising:

polymerizing vinylic monomers in the presence of an initiator, a hydrophobic ester or partial ester of a drying oil acid and a polyol, a reducing agent, and a compound that reversibly changes oxidation state.

14. The method of claim 13, wherein the polymerization is performed at a temperature of from about 5° C. to about 30° C.

15. The method of claim 13, wherein the polymerization is performed in the presence of a chain transfer agent.

16. The method of claim 15, wherein the chain transfer agent is present in an amount of from about 0.001 to about 5% by weight based on the total weight of all monomers.

17. The method of claim 13, wherein from about 5% to about 90% by weight of the vinyl monomers are selected from co-esters of a drying oil acid and an α,β-polymerizable unsaturated carboxylic acid with a polyol.

18. The method of claim 17, wherein the co-esters have the general formula $$(R_dCO_2)_1(M)_mZX_n$$

wherein $R_d$ is a structure including at least one carbon-carbon double bond and is derived from a $C_{10}$–$C_{24}$ drying-oil acid, M is a moiety including at least one polymerizable carbon-carbon double bond, X is a hydroxyl, acyloxyl, halogen, alkoxyl or carboalkoxyl group, Z is an aliphatic or aliphatic aromatic hydrocarbyl or heterohydrocarbyl radical having 1+m+n open valences, 1 and m are each a positive integer having a minimum value of 1, and n is zero or a positive integer.

19. The method of claim 18, wherein the vinylic monomers comprise from about 5 to about 95% of monomers selected from the group consisting of acrylic acid, methacrylic acid, acrylic acid esters, methacrylic acid esters, alkenes, polymerizable carboxylic acids, acrylamide, acrylonitrile, dienes, styrenic monomers, vinyl carboxylate esters and vinyl halides.

20. The method of claim 18, wherein the vinylic monomers comprise from about 5% to about 95% of monomers selected from the group consisting of acrylic acid, methacrylic acid, acrylic acid esters, methacrylic acid esters, styrenic monomers, and vinyl carboxylate esters.

21. The method of claim 17, wherein the hydrophobic ester or partial ester of a drying oil acid and a polyol is present in an amount of from 0.5% to about 30% by weight based on the weight of the copolymer.

22. The method of claim 21, wherein the hydrophobic ester or partial ester of a drying oil acid and a polyol is selected from the group consisting of monoesters and diesters of ethylene glycol and a $C_{10}$–$C_{24}$ drying oil acid, and mono, di and triglycerides of $C_{10}$–$C_{24}$ drying oil acids.

23. A method for preparing an aqueous dispersion comprising:

preparing a pre-emulsion of vinylic monomers comprising from about 5% to about 90% by weight of vinyl monomers selected from co-esters of a drying oil acid and an α,β-polymerizable unsaturated carboxylic acid with a polyol, from about 0.1 to about 10% by weight based on the total weight of all monomers of at least one surfactant, from about 0.5 to about 10% by weight based on the weight of all monomers of a reducing agent, from about 0.001 to about 1.5% by weight based on the total weight of all monomers of a compound that reversibly changes oxidation state, from about 0.001 to about 5% by weight based on the total weight of all monomers of a chain regulator, and from about 0.5% to about 30% by weight based on the total weight of all monomers of a hydrophobic ester or partial ester of a drying oil acid and a polyol;

homogenizing the pre-emulsion;

introducing a free radical initiator, while maintaining the temperature from about 5° C. to about 40° C.; and polymerizing the vinylic monomers.

24. The method of claim 23, wherein the co-esters have the general formula $$(R_dCO_2)_1(M)_mZX_n$$

wherein $R_d$ is a structure including at least one carbon-carbon double bond and is derived from a $C_{10}$–$C_{24}$ drying-oil acid, M is a moiety including at least one polymerizable carbon-carbon double bond, X is a hydroxyl, acyloxyl, halogen, alkoxyl or carboalkoxyl group, Z is an aliphatic or aliphatic aromatic hydrocarbyl or heterohydrocarbyl radical having 1+m+n open valences, 1 and m are each a positive integer having a minimum value of 1, and n is zero or a positive integer.

25. The method of claim 24, wherein the vinylic monomers comprise from about 5 to about 95% of monomers selected from the group consisting of acrylic acid, methacrylic acid, acrylic acid esters, methacrylic acid esters, alkenes, polymerizable carboxylic acids, acrylamide, acrylonitrile, dienes, styrenic monomers, vinyl carboxylate esters and vinyl halides.

26. The method of claim 24, wherein the vinylic monomers comprise from about 5% to about 95% of monomers selected from the group consisting of acrylic acid, methacrylic acid, acrylic acid esters, methacrylic acid esters, styrenic monomers, and vinyl carboxylate esters.

27. The method of claim 26, wherein the hydrophobic ester or partial ester of a drying oil acid and a polyol is selected from the group consisting of monoesters and diesters of ethylene glycol and a $C_{10}$–$C_{24}$ drying oil acid, and mono, di and triglycerides of $C_{10}$–$C_{24}$ drying oil acids.

* * * * *

UNITED STATES PATENT AND TRADEMARK OFFICE
CERTIFICATE OF CORRECTION

PATENT NO. : 6,177,510 B1
DATED : January 23, 2001
INVENTOR(S) : John C. Saam

It is certified that error appears in the above-identified patent and that said Letters Patent is hereby corrected as shown below:

Column 2,
Line 34, "catalysts" should be -- catalyst --.

Column 4,
Line 3, "form" should be -- from --.

Column 6,
Line 23, "mono and diglycerides" should be -- mono- and diglycerides --.

Column 9,
Line 36, "Aerosol TO$^{TM}$*" should be -- Aerosol OT$^{TM}$* --.

Column 10,
Line 51, delete "by" (first occurrence).

Column 12,
Line 8, "Aerosol TO$^{TM}$*" should be -- Aerosol OT$^{TM}$* --.

Column 15,
Line 19, "soaded" should be -- soaked --.

Column 16, claim 6,
Line 64, "mono, di and triglycerides" should be -- mono-, di- and triglycerides --.

Column 17, claim 12,
Line 41, "mono, di and triglycerides" should be -- mono-, di- and triglycerides --.

UNITED STATES PATENT AND TRADEMARK OFFICE
CERTIFICATE OF CORRECTION

PATENT NO. : 6,177,510 B1
DATED : January 23, 2001
INVENTOR(S) : John C. Saam

It is certified that error appears in the above-identified patent and that said Letters Patent is hereby corrected as shown below:

Column 18, claim 22,
Line 27, "mono, di and triglycerides" should be -- mono-, di- and triglycerides --.

Column 20, claim 27,
Line 5, "mono, di and triglycerides" should be -- mono-, di- and triglycerides --.

Signed and Sealed this

Eighteenth Day of December, 2001

Attest:

JAMES E. ROGAN
*Director of the United States Patent and Trademark Office*

*Attesting Officer*